United States Patent
Cho et al.

(10) Patent No.: US 8,558,444 B2
(45) Date of Patent: Oct. 15, 2013

(54) FIELD EMISSION TYPE SURFACE LIGHT SOURCE DEVICE AND IMAGE DISPLAY APPARATUS EMPLOYING THE SAME

(75) Inventors: Hyun-seung Cho, Anyang-si (KR); Byong-gon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 13/041,911

(22) Filed: Mar. 7, 2011

(65) Prior Publication Data
US 2011/0227960 A1   Sep. 22, 2011

(30) Foreign Application Priority Data
Mar. 22, 2010   (KR) .................. 10-2010-0025308

(51) Int. Cl.
*H01J 17/49*   (2012.01)
(52) U.S. Cl.
USPC .......................... 313/495; 313/497
(58) Field of Classification Search
USPC ................................. 313/495–497
See application file for complete search history.

(56) References Cited

U.S. PATENT DOCUMENTS

| | | | |
|---|---|---|---|
| 2008/0093975 A1* | 4/2008 | Ryu et al. | ........ 313/496 |
| 2009/0021142 A1 | 1/2009 | Park et al. | |
| 2009/0033205 A1 | 2/2009 | Lee | |

FOREIGN PATENT DOCUMENTS

EP   1988145 A2   11/2008

OTHER PUBLICATIONS

Communication dated Mar. 30, 2012 issued by the European Patent Office in European Application No. 11156662.6.

* cited by examiner

*Primary Examiner* — Anne Hines
(74) *Attorney, Agent, or Firm* — Sughrue Mion, PLLC (57) ABSTRACT

A field emission type surface light source device and an image display apparatus employing the same. The field emission type surface light source device includes a first substrate and a second substrate that are disposed to face each other; a sealing member that seals the first substrate and the second substrate; first electrodes and second electrodes that are disposed on the first substrate such that the first electrodes cross the second electrodes in an insulated state; electron emitters that are electrically connected to one of the first electrodes and the second electrodes; a phosphor layer that is disposed on one surface of the second substrate; a third electrode that is disposed on one surface of the phosphor layer; and a first terminal and a second terminal that are electrically connected the first electrodes and the second electrodes, respectively, and are disposed on a same side of the first substrate outside of a region sealed by the sealing member.

20 Claims, 11 Drawing Sheets

FIELD EMISSION TYPE SURFACE LIGHT SOURCE DEVICE AND IMAGE DISPLAY APPARATUS EMPLOYING THE SAME

CROSS-REFERENCE TO RELATED PATENT APPLICATION

This application claims priority from Korean Patent Application No. 10-2010-0025308, filed on Mar. 22, 2010 in the Korean Intellectual Property Office, the disclosure of which is incorporated herein in its entirety by reference.

BACKGROUND

1. Field

Apparatuses consistent with exemplary embodiments relate to a field emission type surface light source device and an image display apparatus employing the same.

2. Description of the Related Art

Field emission devices (FEDs) emit light by colliding electrons emitted from emitters formed on a cathode with a phosphor formed on an anode. An FED may be used as a backlight unit (BLU) of a display device that cannot emit light itself, for example, a liquid crystal display (LCD), or a surface light source of a lighting device. An FED itself may also be an image display apparatus.

A related art FED has a structure in which a lower substrate including a cathode and a gate electrode and an upper substrate including an anode are sealed and bonded to each other. In general, in the related art FED, a cathode terminal and a gate terminal are respectively disposed at left and upper sides of the lower substrate, and a high-voltage anode terminal is disposed at a right side of the upper substrate.

SUMMARY

Exemplary embodiments provide a field emission type surface light source device that has an arrangement of an electrode terminal and a mounting structure, and an image display apparatus employing the field emission type surface light source device.

According to an aspect of exemplary embodiment, there is provided a field emission type surface light source device including: a first substrate and a second substrate that are disposed to face each other; a sealing member for sealing the first substrate and the second substrate; first electrodes and second electrodes that are disposed on the first substrate such that the first electrodes and the second electrodes cross each other in an insulated state; electron emitters that are electrically connected to any one of the first electrodes and the second electrodes; a phosphor layer disposed on one surface of the second substrate; a third electrode disposed on one surface of the phosphor layer; and a first terminal and a second terminal that are electrically connected the first electrodes and the second electrodes, respectively, and are disposed on a same side of the first substrate on the outside of a region sealed by the sealing member.

The first substrate and the second substrate may be quadrilateral flat plates, and the sealing member may have a quadrilateral lattice shape.

A light-emitting region defined by regions where the first electrodes and the second electrodes cross each other emits light in block units, the first electrodes positioned in the same block unit are connected to the first terminal through a common first connecting line, and the second electrodes positioned in the same block unit are connected to the second terminal through a common second connecting line.

Trenches may be formed in regions where the first electrodes are disposed on the first substrate, and the first electrodes may be disposed on lower surfaces of the trenches. Alternately, an insulating layer may be disposed in a region formed between the first electrodes, and the second electrodes may be disposed on the insulating layer.

The first connecting lines alternately extend to both sides of the light-emitting region to be connected to the first terminal. Alternately, the first connecting lines may extend to one side of the light-emitting region to be connected to the first terminal.

Trenches may be formed in regions where the first electrodes are disposed on the first substrate, and the first electrodes are disposed on lower surfaces of the trenches; and the trenches may be formed to extend from the light-emitting region, and the first connecting lines are disposed on lower surfaces of the extending trenches. At this time, one or more first connecting lines may be disposed in each of the extending trenches.

The field emission type surface light source device may further include a third terminal for connecting the third electrode to the outside and disposed at the same side of the first substrate that the first terminal and the second terminal are disposed, and a connecting electrode for connecting the third electrode and disposed in the sealing member.

The connecting electrode may be formed to pass through the sealing member. The connecting electrode may have a clip shape that is inserted into a part of an outer portion of the sealing member. The connecting electrode may surround a part of the outer portion of the sealing member.

The electron emitters may be disposed only on the first electrode, so that the first electrode functions as a cathode, the second electrode may function as a gate electrode, and the third electrode functions as an anode.

The field emission type surface light source device may further include a housing in which the first substrate and the second substrate are installed, wherein the housing includes a three-surface box type bottom chassis of which one opened surface portion exposes the first terminal and the second terminal, and a side mold inserted into the opened surface portion of the bottom chassis.

A gap may be provided between the bottom chassis and the side mold, and a flexible printed circuit (FPC) for connecting the first terminal and the second terminal to an external backlight control substrate may pass through the gap.

The first substrate may include a terminal projecting portion extending in a direction in which the first terminal and the second terminal are disposed with respect to the second substrate; and the terminal projecting portion may be inserted into a first socket portion that is disposed in the side mold and electrically connects the first and second terminals to the external backlight control substrate. The terminal projecting portion may include the first terminals and the second terminals each having a protruding structure. The terminal projecting portion may have a straight end portion. The external backlight control substrate may be inserted into a second socket portion that is disposed in the side mold and is electrically connected to the first socket portion.

According to an aspect of another exemplary embodiment, there is provided an image display apparatus including: a backlight unit; and a display panel for forming an image by using light emitted from the backlight unit; wherein the backlight unit may be the above-mentioned field emission type surface light source device.

The display panel may be a liquid crystal display panel.

BRIEF DESCRIPTION OF THE DRAWINGS

The above and/or other aspects will become more apparent by describing exemplary embodiments with reference to the attached drawings in which.

DETAILED DESCRIPTION OF EXEMPLARY EMBODIMENTS

Exemplary embodiments will now be described more fully with reference to the accompanying drawings. However, the invention should not be construed as being limited to the exemplary embodiments set forth herein. In the drawings, the thicknesses of layers and regions may be exaggerated for clarity. Like reference numerals denote like elements throughout the specification.

Figure 1:
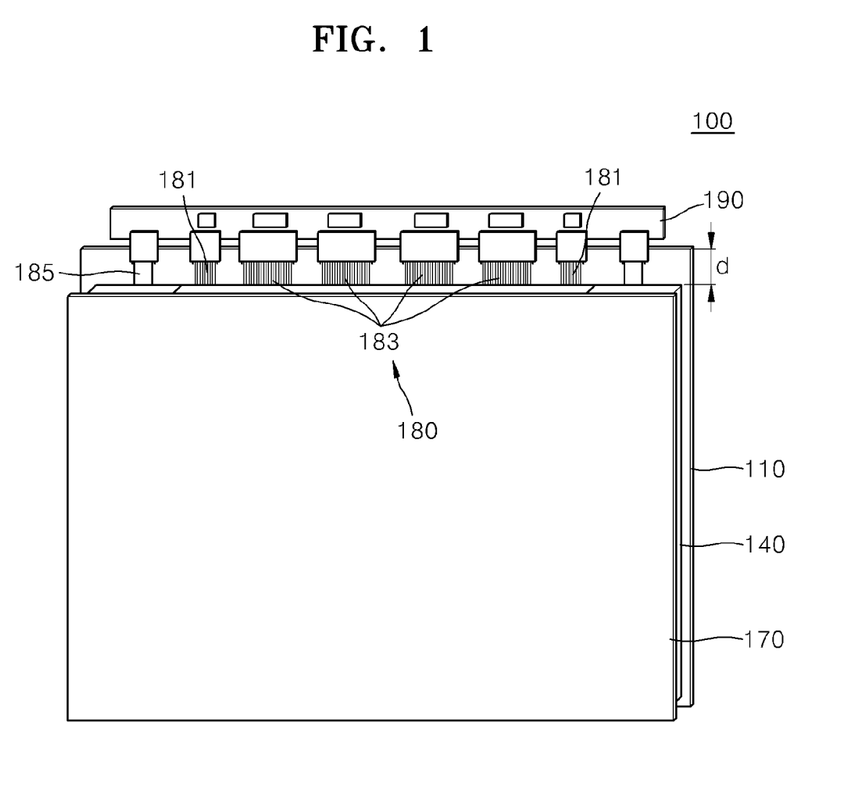
FIG. 1 is a schematic view of a field emission type surface light source device according to an exemplary embodiment.
Figure 2:
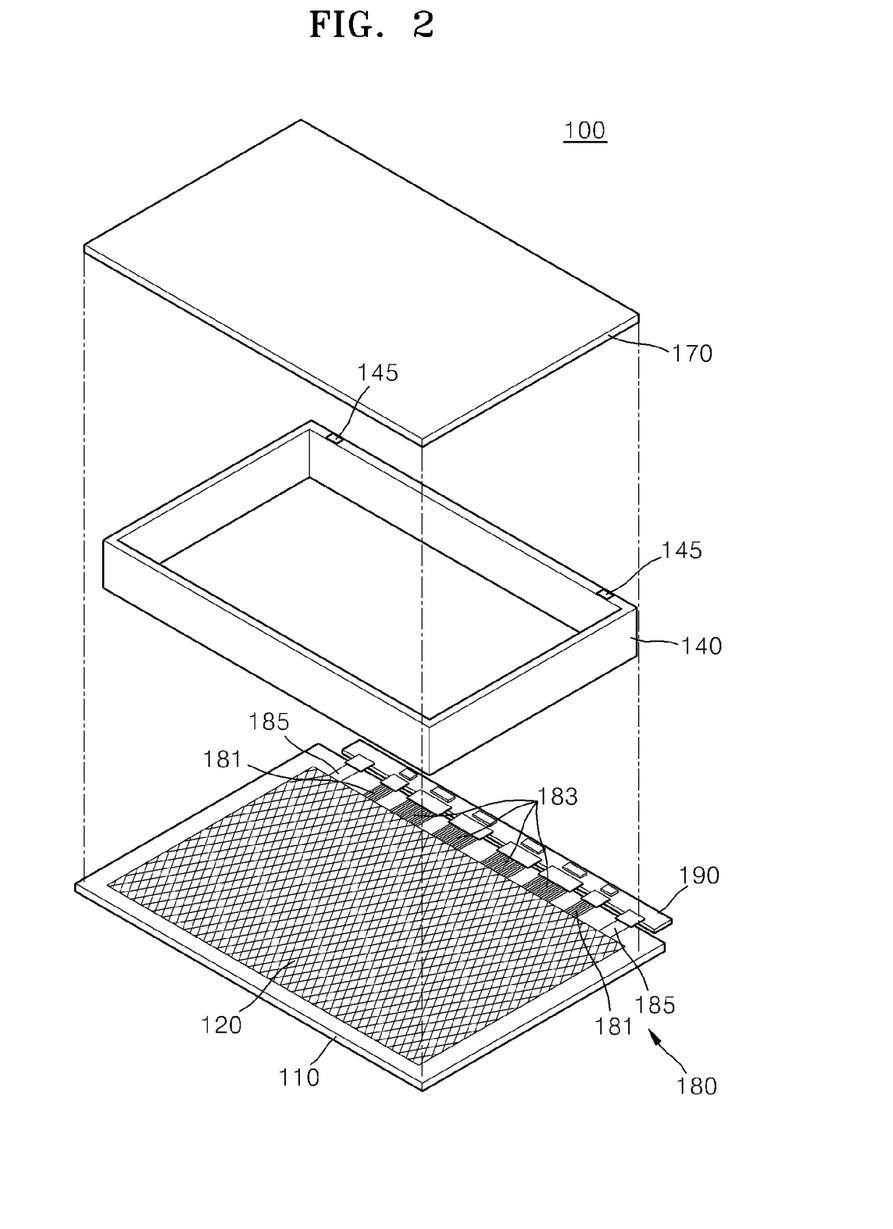
FIG. 2 is an exploded perspective view illustrating the exemplary field emission type surface light source device illustrated in FIG. 1.
Figure 3:
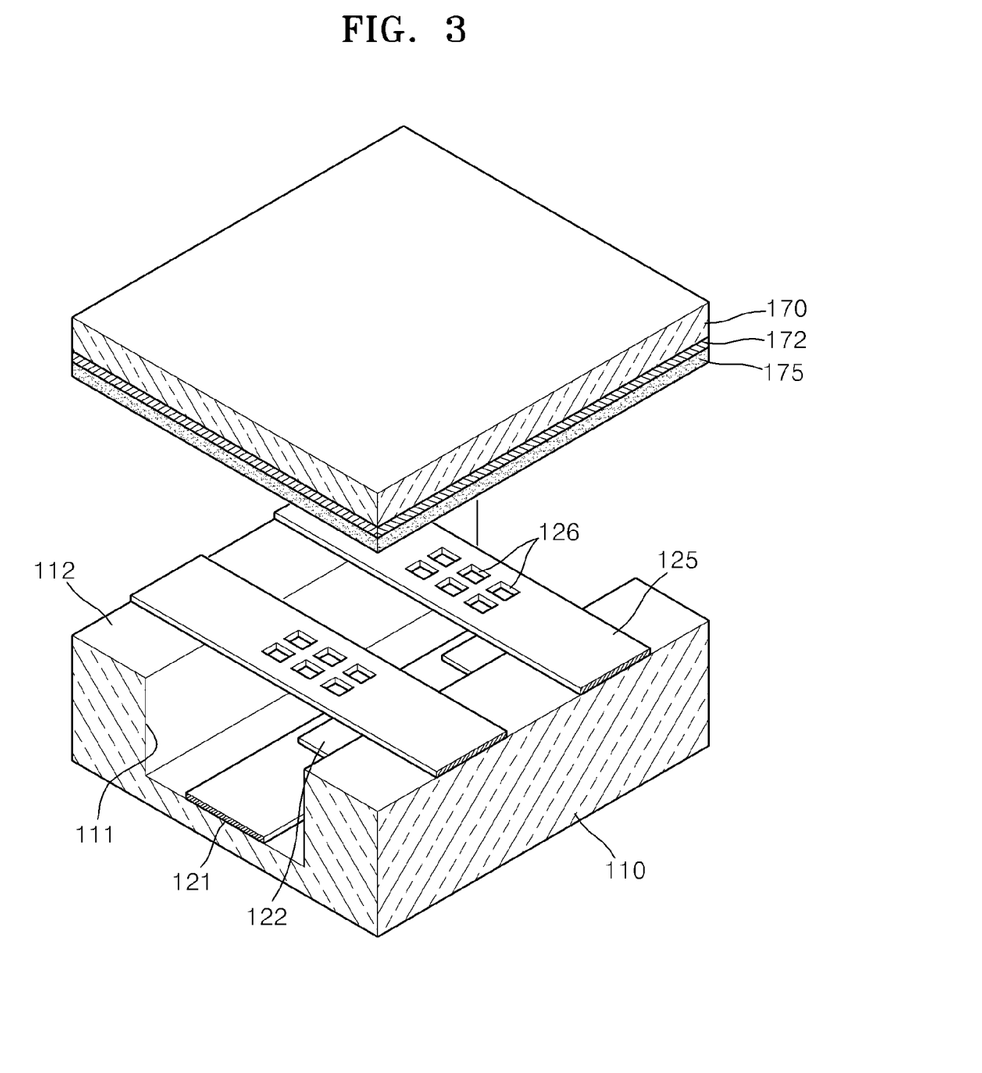
FIG. 3 is a partial perspective view illustrating an arrangement of first through third electrodes of the exemplary field emission type surface light source device illustrated in FIG. 1.
Figure 4:
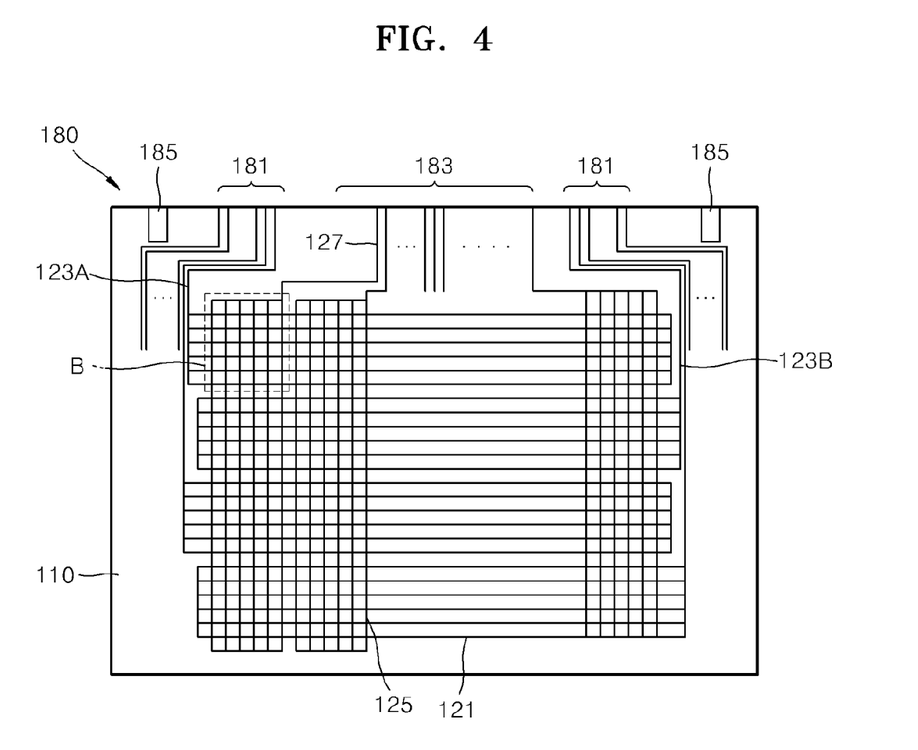
FIG. 4 illustrates wiring lines of the first through third electrodes of the exemplary field emission type surface light source device illustrated in FIG. 1.

FIGS. 1 through 4 are schematic views illustrating a field emission type surface light source device 100 according to an exemplary embodiment. FIG. 1 is a front view illustrating the field emission type surface light source device 100, according to an exemplary embodiment. FIG. 2 is an exploded perspective view illustrating the field emission type surface light source device 100 of FIG. 1. FIG. 3 is a partial perspective view illustrating an arrangement of first through third electrodes 121, 125, and 172 of the field emission type surface light source device 100 of FIG. 1. FIG. 4 illustrates wiring lines of the first through third electrodes 121, 125, and 172 of the field emission type surface light source device 100 of FIG. 1.

Referring to FIGS. 1 and 2, in the field emission type surface light source device 100 according to the current exemplary embodiment, a first substrate 110 and a second substrate 170, facing each other at an interval (e.g., a predetermined interval), are sealed by a sealing member 140, and a light-emitting structure is installed in the sealed space due to triode-electron emission.

In detail, the first substrate 110 and the second substrate 170 are quadrilateral plates each having a thickness (e.g., a predetermined thickness). In general, the first substrate 110 and the second substrate 170 may be a glass substrate, but is not limited thereto, and other materials as known by those skilled in the art may be substituted therefore without departing from the scope of the invention. The second substrate 170 may be formed of a transparent material to a wavelength band of light emitted from a phosphor layer 175 (see FIG. 3). The sealing member 140 may have a quadrilateral lattice shape having a thickness (e.g., a predetermined thickness), and may be formed of the substantially same material as the first substrate 110 and the second substrate 170.

The first through third electrodes 121, 125, and 172 (see FIG. 3) and electron emitters 122 (see FIG. 3), as will be described later, are disposed in the space sealed by the first substrate 110, the second substrate 170 and the sealing member 140. The first electrodes 121 and the second electrodes 125 cross each other at region 120. The region 120, as will be described later, may be a light-emitting region formed by emitted electrons and may be sealed by the sealing member 140.

The first substrate 110 may have a region extending by a length d (e.g., a predetermined length) from the region 120 sealed by the sealing member 140. A terminal projecting portion 180 is disposed in the extending region of the first substrate 110. The terminal projecting portion 180 includes first through third terminals 181, 183, and 185 for respectively electrically connecting the first through third electrodes 121, 125, and 172 to an external control substrate 190. As such, the first through third terminals 181, 183, and 185 are disposed only at the same side of the first substrate 110, i.e., at an upper side of the first substrate 110 in FIG. 1, and thus, an additional terminal is not disposed at the other sides of the first substrate 110, i.e., at lower, left and right sides of the first substrate 110. Areas of the other sides of the first substrate 110, which do not include an additional terminal, may be minimized, and thus an invalid light emitting region, which is not directly related to light-emitting in the first substrate 110, may be minimized. Also, since the first through third terminals 181, 183, and 185 are disposed at the same side of the first substrate 110, i.e., at the upper side of the first substrate 110, the first through third terminals 181, 183, and 185 may be installed inside a housing 210 (see FIG. 12) of the field emission type surface light source device 100, as will be described later. Furthermore, when the field emission type surface light source device 100 is used as a backlight unit 220

(see FIG. 12) of an image display apparatus 200 (see FIG. 12), the image display apparatus 200 may be assembled.

Referring to FIGS. 3 and 4, the first electrodes 121 are formed on the first substrate 110 in parallel at intervals (e.g., predetermined intervals). For example, the first electrodes 121 may be formed in a narrow, long, and flat stripe shape. The first electrodes 121 may be formed of an electric conductive material. For example, the first electrodes 121 may be formed of a metal such as aluminum (Al), titanium (Ti), chromium (Cr), nickel (Ni), gold (Au), silver (Ag), molybdenum (Mo), tungsten (W), platinum (Pt), copper (Cu) or palladium (Pd) or an alloy thereof, a conductive material printed with a metal or a metal oxide such as Pd, Ag, RuO2, or Pd—Ag, a transparent conductive material such as In2O3 or SnO2, or a semiconductor material such as polysilicon. However, the formation material is not limited thereto, and other formations materials may be substituted therefore, as understood by those skilled in the art. The electron emitter 122 may be disposed on each of the first electrodes 121.

The second electrodes 125 may be disposed on the first substrate 110 in a direction in which the second electrodes 125 and the first electrodes 121 cross each other in an insulated state. The second electrode 125 may include at least one through-hole 126 in a region where the second electrode 125 and the first electrode 121 cross each other. For example, the second electrode 125 may also be formed in a narrow, long, and flat stripe shape, and may be formed of the same material as the first electrode 121.

A plurality of trenches 111 may be formed in the first substrate 110 in parallel at intervals (e.g., predetermined intervals) so that the first electrodes 121 and the second electrodes 125 are maintained in the insulated state. Thus, a plurality of ridges 112 may be formed between the adjacent trenches 111. The first electrode 121 is disposed on a bottom surface of the trench 111, and the second electrode 125 is disposed on the ridges 112 so as to cross the ridges 112. Alternatively, an insulating layer (not shown) may be disposed to a predetermined height in a region between the first electrodes 121 on the first substrate 110, and the second electrodes 125 may be disposed on the insulating layer. In the current exemplary embodiment, the insulating layer corresponds to the ridges 112.

The electron emitters 122 emit electrons by an electric field formed between the first electrodes 121 and the second electrodes 125. The electron emitter 122 may be formed of an electron emitting material such as carbon nano tubes (CNT), and may have a metallic needle shape with a sharp end portion so as to emit electrons. The electron emitters 122 may be electrically connected to any one of the first electrodes 121 and the second electrodes 125.

The third electrode 172 may be disposed on a lower surface of the second substrate 170 facing the first substrate 110. The third electrode 172 may be formed to cover the entire lower surface of the second substrate 170 and may be formed in a stripe shape or mesh shape. The third electrode 172 may be formed of a transparent conductive material such as indium tin oxide (ITO). The phosphor layer 175 may be disposed on a lower surface of the third electrode 172. The phosphor layer 175 may be formed of a cathode luminescence (CL) type phosphor material that is excited by electrons, which are emitted from the electron emitters 122 and are accelerated, so as to generate visible light. When the field emission type surface light source device 100 according to the current exemplary embodiment is used as a backlight unit of an image display apparatus, the phosphor layer 175 may be formed of a phosphor material that generates white light, as will be described later.

Under different conditions, the locations of the third electrode 172 and the phosphor layer 175 may be reversed. In this case, the third electrode 172 may be formed of a conductive material such as a metal, and may be formed of a thin film having a thickness through which the electrons, which are emitted from the electron emitter 122 and are accelerated, may sufficiently penetrate.

In the current exemplary embodiment, as the electron emitters 122 are disposed only on the first electrodes 121, the first electrodes 121 function as a cathode, the second electrodes 125 function as a gate electrode, and the third electrode 172 functions as an anode. That is, a negative voltage is applied to the first electrodes 121, and a positive voltage is applied to the second electrodes 125, and thus electrons are emitted from the electron emitters 122 toward the second electrodes 125 due to an electric field formed between the first electrodes 121 and the second electrodes 125. The emitted electrons move toward the third electrode 172 through the through-holes 126, which are to be described later, and then are accelerated by the third electrode 172.

The accelerated electrons excite the phosphor layer 175 adjacent to the third electrode 172 so as to generate light. The emission of electrons may be controlled by a voltage applied to the second electrode 125. However, a negative voltage is not necessarily applied to the first electrode 121, and thus an appropriate potential difference required in the emission of electrons has only to be formed between the first electrode 121 and the second electrode 125.

As illustrated in FIG. 4, so that the region 120 defined by regions where the first electrodes 121 and the second electrodes 125 cross each other emits light in block units, the first electrodes 121 positioned in the same block B may be connected to the first terminal 181 through first connecting lines 123A and 123B, and the second electrodes 125 positioned in the same block B may be connected to the second terminal 183 through a second connecting line 127. The first electrodes 121 and the second electrodes 125, which are positioned in different blocks, are electrically independent to be connected to the first and second terminals 181 and 183, respectively. As such, since the first and second electrodes 121 and 125 are connected in block units, the field emission type surface light source device 100 according to the current exemplary embodiment may emit light in block units. Accordingly, when the field emission type surface light source device 100 according to the current exemplary embodiment is used as a backlight unit of an image forming apparatus, as will be described later, driving in block units enables a dimming function for partially lighting a display panel 260.

Figure 5:
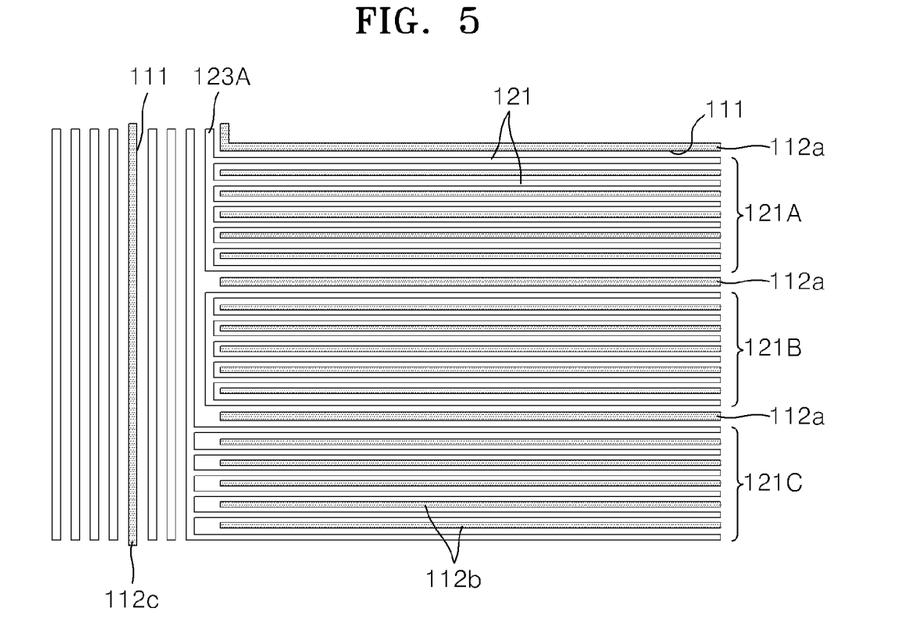
FIG. 5 illustrates a connection of the first electrodes of the field emission type surface light source device of FIG. 1, according to an exemplary embodiment.

The first connecting lines 123A and 123B according to the current exemplary embodiment are separated into left and right sides respectively so as to connect the first electrodes 121 to the first terminal 181. FIG. 5 illustrates a connection of the first connecting lines 123A and 123B (not shown in FIG. 5) in detail. Referring to FIGS. 4 and 5, the first electrodes 121 are grouped in block units, so that first electrodes 121A of a first group are connected to the first terminal 181 through the first connecting line 123A disposed at the left side of the first substrate 110, first electrodes 121B of a second group are connected to the first terminal 181 through the first connecting line 123B (not shown) disposed at the right side of the first substrate 110, and first electrodes 121C of a third group are connected to the first terminal 181 through the first connecting line 123A disposed at the left side of the first substrate 110.

As such, the first electrodes 121 grouped in block units are alternately connected to one another through the first connecting lines 123A, 123B disposed at the respective left and right sides of the first substrate 110, and thus are connected to the first terminal 181. As illustrated in FIG. 4, the first terminal 181 is disposed at the same side of the first substrate 110 that the second terminal 183 of the first substrate 110 is disposed.

The trenches 111 (see FIG. 3), which are formed in regions where the first electrodes 121 are disposed, are formed in the first substrate 110 to extend from the light-emitting region, so that the first connecting lines 123A and 123B may be disposed on bottom surfaces of the extending trenches 111. In FIG. 5, reference numeral 112a denotes a ridge for dividing the light-emitting region in block units, reference numeral 112b denotes a ridge formed between the first electrodes 121 in the same block, and reference numeral 112c denotes a ridge formed between the extending trenches 111.

FIG. 4 illustrates a case where the first terminals 181 are disposed with the second terminal 183 interposed therebetween, but the present invention is not limited thereto. The first connecting lines 123A and 123B are disposed on bottom surfaces of the extending trenches 111. The second connecting line 127 for connecting the second electrodes 125 is disposed together with the second electrodes 125 on the ridge 112 of the first substrate 110. Thus, even if the first connecting lines 123A and 123B, disposed at the left and right sides of the first substrate 110, and the second connecting line 127 cross each other, they are not electrically connected to each other. Accordingly, the first terminal 181 is disposed only on one side of the first substrate 110, and any one of the first connecting lines 123A and 123B disposed on the left and right sides of the first substrate 110 may cross the second connecting line 127 to connect to the first terminal 181.

In the current exemplary embodiment, the first electrodes 121 grouped in block units are alternately connected to one another through the first connecting lines 123A and 123B disposed on the left and right sides of the first substrate 110, but the present invention is not limited thereto.

Figure 6:
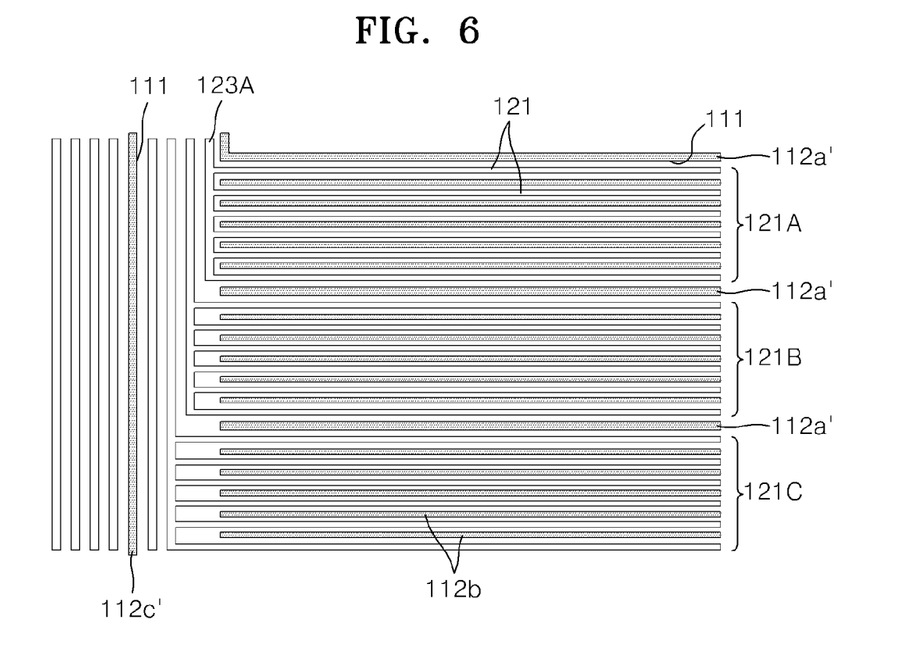
FIGS. 6 through 8 illustrate connections of the first electrodes of the exemplary field emission type surface light source device illustrated in FIG. 1, according to other exemplary embodiments.

FIG. 6 illustrates a connection between the first electrodes 121 and the first terminal 181, according to another exemplary embodiment. All the first electrodes 121 grouped in block units are connected to the first terminal 181 in block units through the first connecting line 123A disposed on the left side of the first substrate 110. In this case, the first terminal 181 may be disposed only at the left side of the second terminal 183. Also, a plurality of first connecting lines 123A may be disposed in one extending trench 111.

FIG. 5 illustrates a case where the plurality of first connecting lines 123A and 123B are disposed in only one extending trench 111, but the present invention is not limited thereto.

Figure 7:
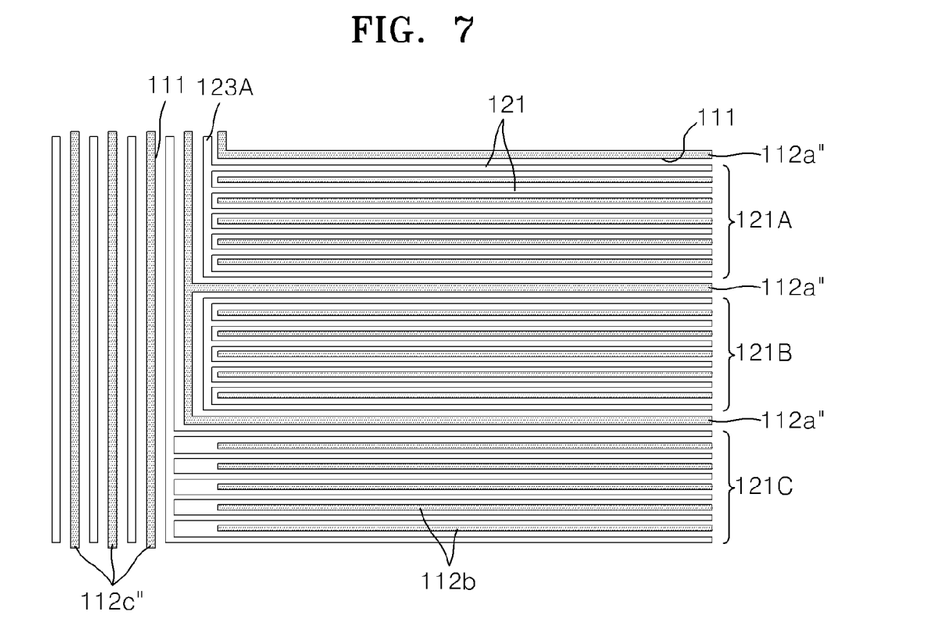

FIG. 7 illustrates a connection between the first electrodes 121 and the first terminal 181, according to another exemplary embodiment. Although the first electrodes 121 grouped in block units are alternately connected to one another through the first connecting lines 123A and 123B disposed at the left and right sides of the first substrate 110, each of the first connecting lines 123A and 123B are disposed in a respective extending trench 111.

Figure 8:
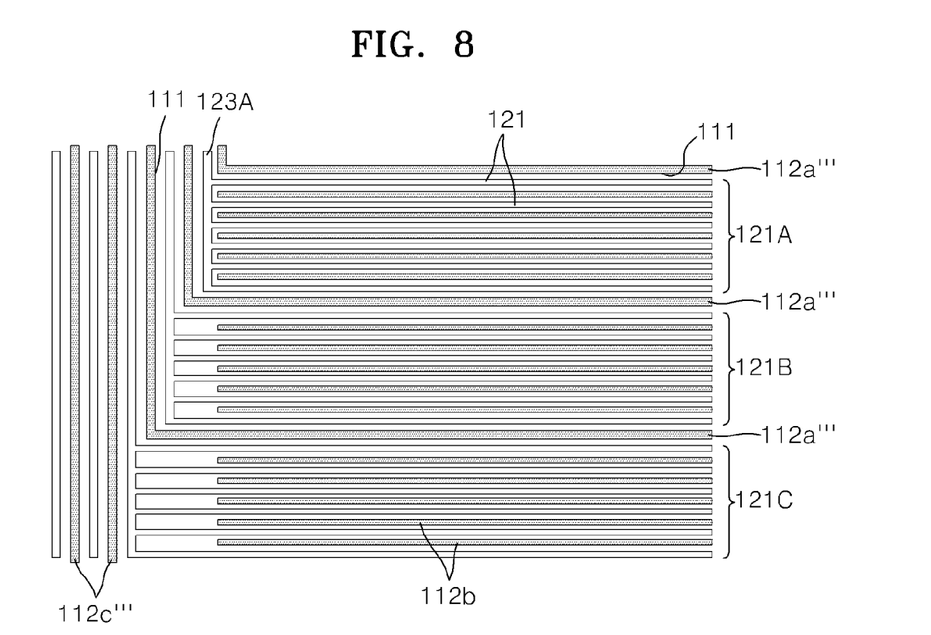

FIG. 8 illustrates a connection between the first electrodes 121 and the first terminal 181, according to another exemplary embodiment. All the first electrodes 121 grouped in block units are connected to one another in block units through the first connecting line 123A disposed at the left side of the first substrate 110, and thus are connected to the first terminal 181, and each of the first connecting lines 123A disposed at the left side is disposed in a respective extending trench 111.

Referring back to FIG. 4, the third terminal 185 is disposed at the same side of the first substrate 110 that the first and second terminals 181 and 183 are disposed.

Figure 9:
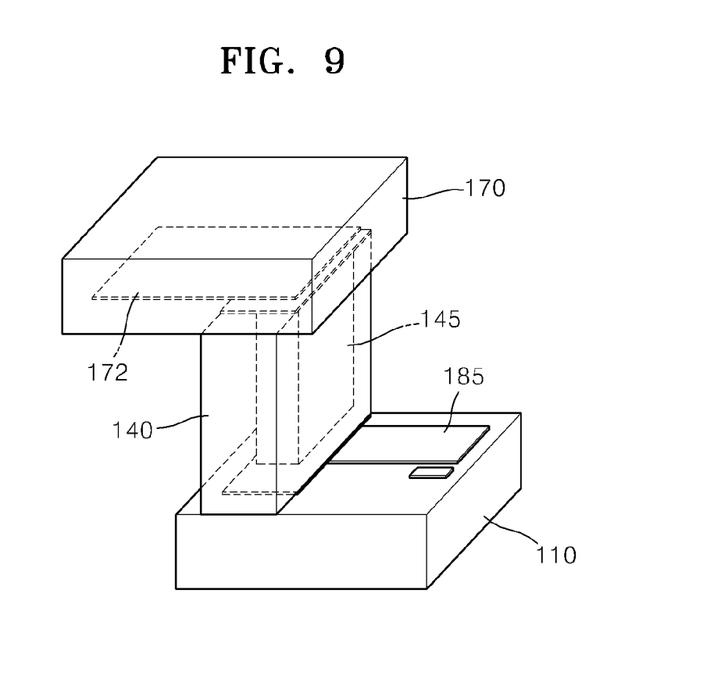
FIG. 9 illustrates a connection of a third electrode of the exemplary field emission type surface light source device illustrated in FIG. 1, according to an exemplary embodiment.

FIG. 9 illustrates a connection between the third electrode 172 on the second substrate 170 and the third terminal 185 on the first substrate 110, according to an exemplary embodiment. A connecting electrode 145 for connecting the third electrode 172 and the third terminal 185 is inserted into the sealing member 140 and exposed at upper and lower surfaces of the sealing member 140. The third electrode 172 disposed on the second substrate 170 extends from a contact area between the sealing member 140 and the third electrode 172, and also the third terminal 185 disposed on the first substrate 110 extends from a contact area between the sealing member 140 and the third terminal 185. Thus, when the first substrate 110 and the second substrate 170 are sealed and bonded to each other with the sealing member 140, the connecting electrode 145 contacts the extended portions of the third electrode 172 and the third terminal 185, and thus the third electrode 172 positioned in the sealed space and the third terminal 185 positioned outside of the sealed space are connected to each other.

Figure 10:
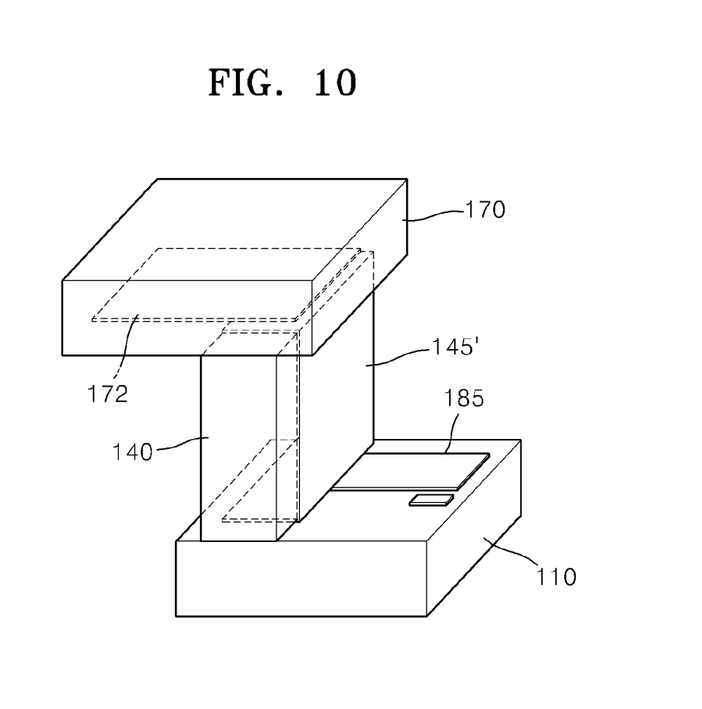
FIGS. 10 and 11 illustrate connections of the third electrode of the exemplary field emission type surface light source device illustrated in FIG. 1, according to other exemplary embodiments.

FIG. 10 illustrates a connecting electrode 145' according to another exemplary embodiment. Referring to FIG. 10, the connecting electrode 145' for connecting the third electrode 172 and the third terminal 185 has a clip structure that surrounds a part of an outer portion of the sealing member 140. Upper and lower portions of the sealing member 140 respectively contact the portions of the third electrode 172 and the third terminal 185 via the connecting electrode 145' so as to connect the third electrode 172 and the third terminal 185.

Figure 11:
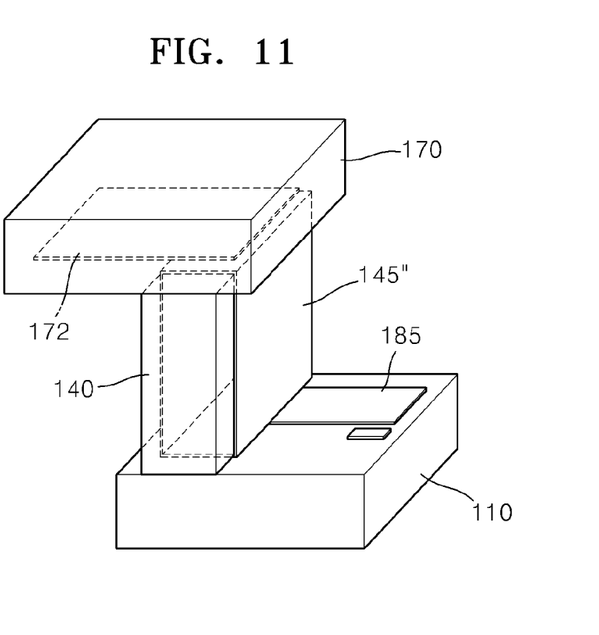

FIG. 11 illustrates a connecting electrode 145" according to another exemplary embodiment. The connecting electrode 145" for connecting the third electrode 172 and the third terminal 185 surrounds a part of the sealing member 140, and upper and lower portions of the sealing member 140 respectively contact portions of the third electrode 172 and the third terminal 185 via the connecting electrode 145', so as to connect the third electrode 172 and the third terminal 185.

Figure 12:
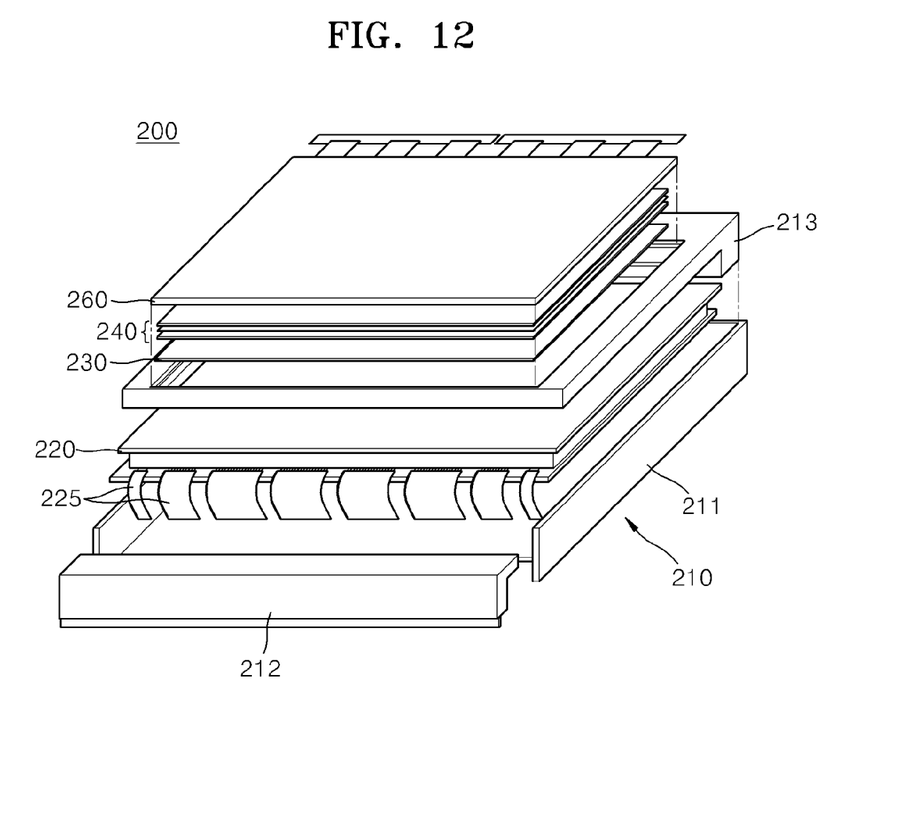
FIG. 12 is a schematic exploded perspective view illustrating an image display apparatus employing a field emission type surface light source device, according to an exemplary embodiment.
Figure 13:
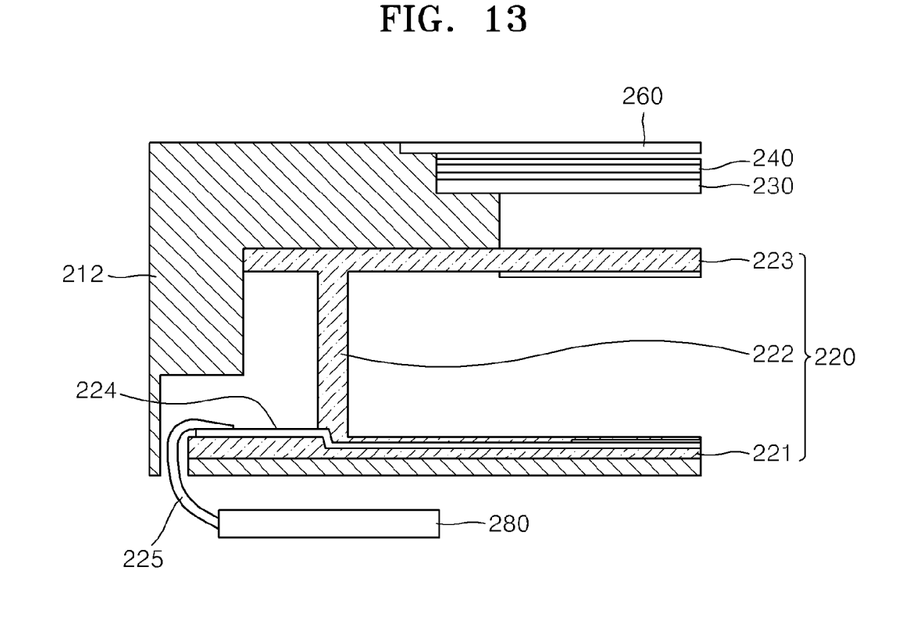
FIG. 13 is a partial cross-sectional view illustrating a connection between terminals of the exemplary image display apparatus illustrated in FIG. 12 and an external backlight control substrate, according to an exemplary embodiment.

FIG. 12 is a schematic exploded perspective view illustrating the image display apparatus 200 according to an exemplary embodiment. FIG. 13 is an exemplary partial cross-sectional view illustrating a connection between terminals of the image display apparatus 200 and an external backlight control substrate.

Referring to FIGS. 12 and 13, the image display apparatus 200 includes the backlight unit 220, the display panel 260, and the housing 210 in which the backlight unit 220 and the display panel 260 are installed.

The display panel 260 is a non-emissive display device that does not emit light itself and may be a liquid crystal display panel.

The backlight unit 220 may be a field emission type surface light source device according to the above-described exemplary embodiment. Reference numeral 221, 222, and 223 denote a first substrate, a seal member, and a second substrate, respectively. A terminal projecting portion 224 is disposed in the extending region of the first substrate 221 and is connected to electrodes 121, 125, and 172 (see FIG. 3) which are sealed by the sealing member 222.

The housing 210 may include a three-surface box type bottom chassis 211 of which one opened surface portion exposes the terminal projecting portion 224 and a side mold 212 that is inserted into the opened surface portion of the bottom chassis 211. Reference numeral 213, which is inserted inside a box space of the bottom chassis 211, is a middle mold for fixing the display panel 260 and the backlight unit 220.

The terminal projecting portion 224 of the backlight unit 220 is connected to the external backlight control substrate 280 through a flexible printed circuit (FPC) 225. As illustrated in FIG. 13, a gap is provided between the bottom chassis 211 and the side mold 212, and the FPC 225 is connected to the backlight control substrate 280 through the gap.

A diffuser panel 230 may be interposed between the backlight unit 220 and the display panel 260. The diffuser panel 230 diffuses light emitted from the backlight unit 220. Furthermore, an optical sheet 240, for example, a prism sheet, may further be interposed between the backlight unit 220 and the display panel 260 so as to improve directivity of the light emitted from the backlight unit 220.

The backlight unit 220 according to the current exemplary embodiment is driven in block units so as to emit light, and thus may have a dimming function capable of partially lighting the display panel 260. The image display apparatus 200 according to the current exemplary embodiment has a contrast based on the dimming function of the backlight unit 220.

Figure 14:
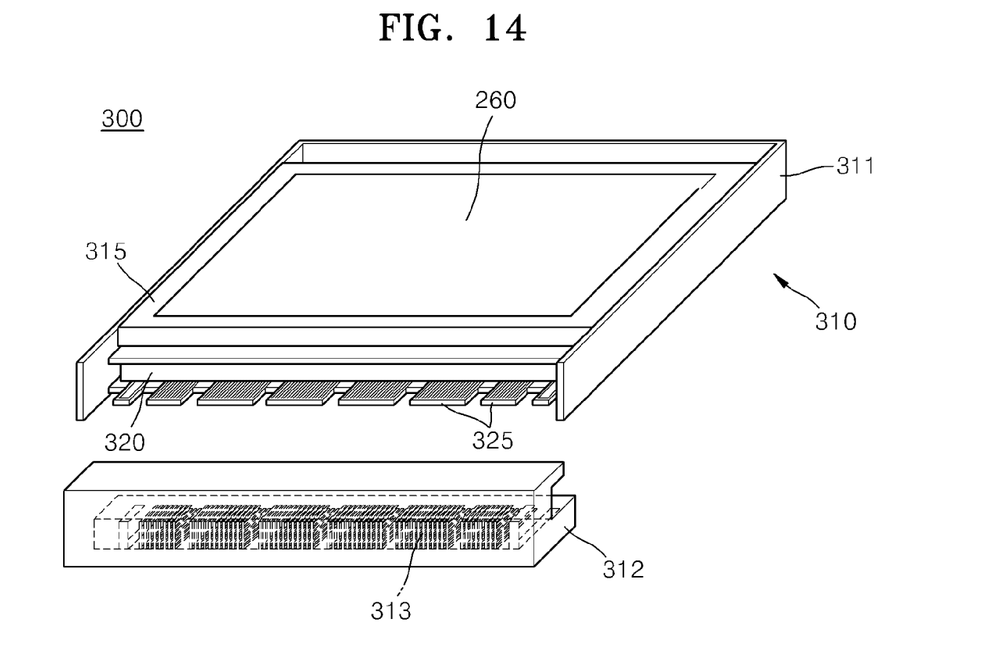
FIG. 14 is a schematic perspective view illustrating an image display apparatus employing a field emission type surface light source device, according to another exemplary embodiment.
Figure 15:
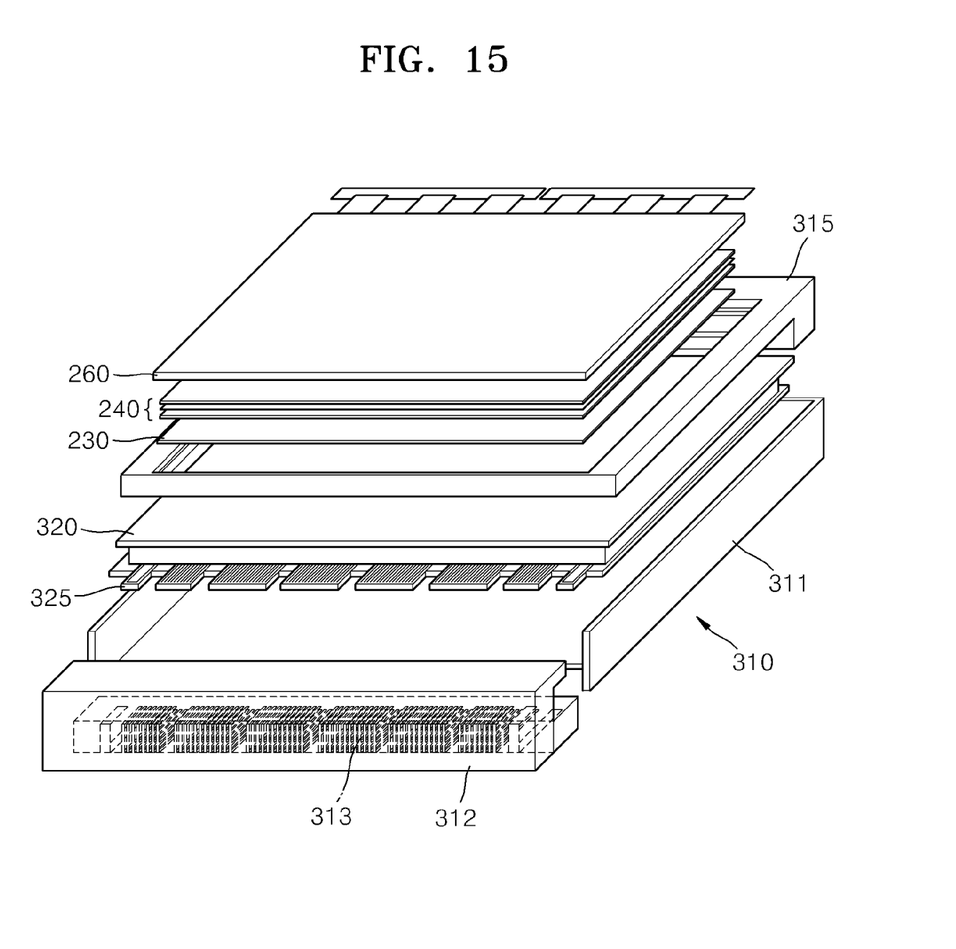
FIG. 15 is a schematic exploded perspective view illustrating the exemplary image display apparatus illustrated in FIG. 14.
Figure 16:
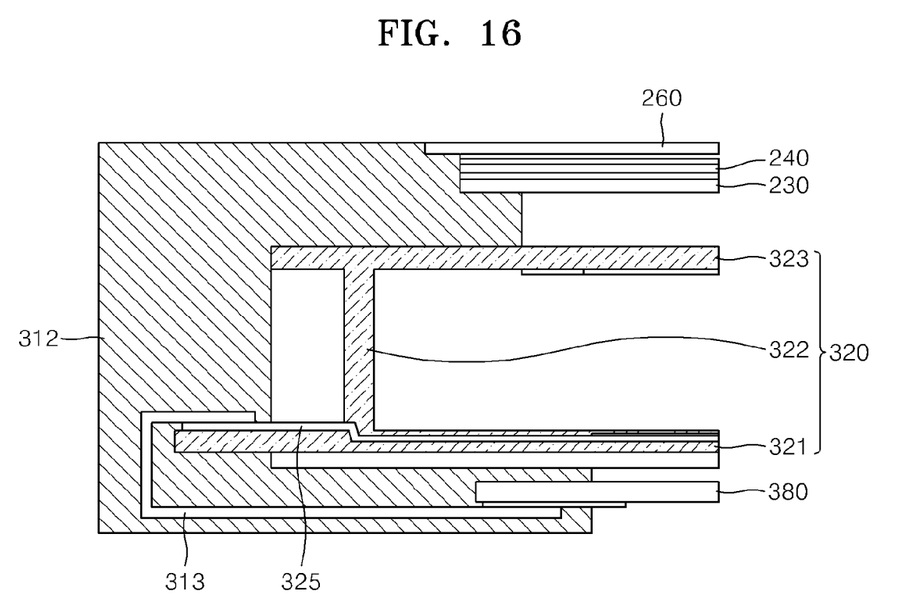
FIG. 16 is a partial cross-sectional view illustrating a connection between terminals of the exemplary image display apparatus illustrated in FIG. 14 and an external backlight control substrate, according to an exemplary embodiment.

FIG. 14 is a schematic perspective view of an image display apparatus 300 employing a field emission type surface light source device according to another exemplary embodiment. FIG. 15 is a schematic exploded perspective view illustrating the image display apparatus 300. FIG. 16 is a partial cross-sectional view illustrating a connection between terminals of the image display apparatus 300 and an external backlight control substrate 380.

Referring to FIGS. 14 through 16, the image display apparatus 300 according to the current exemplary embodiment includes a backlight unit 320, the display panel 260, and a housing 310 in which the backlight unit 320 and the display panel 260 are installed.

The backlight unit 320 may be a field emission type surface light source device according to the above-mentioned exemplary embodiment. Reference numeral 321, 322, and 323 denote a first substrate, a seal member, and a second substrate, respectively. Plurality of terminal projecting portions 325 is disposed in the extending region of the first substrate 321 and is connected to electrodes 121, 125, and 172 (see FIG. 3) which are sealed by the sealing member 322.

The housing 310 may include a three-surface box type bottom chassis 311 of which one opened surface portion exposes the plurality of terminal projecting portions 325, and a side mold 312 that is inserted into the opened surface portion of the bottom chassis 311. Reference numeral 315 denotes a middle mold that is inserted inside a box space of the bottom chassis 311 and fixes the display panel 260, the diffuser panel 230, the optical sheet 240, and the backlight unit 320. The terminal projecting portion 325 of the backlight unit 320 is connected to the external backlight control substrate 380 through a socket 313 disposed in the side mold 312. As illustrated in FIG. 16, the terminal projecting portion 325 of the backlight unit 320 is inserted into the socket 313 disposed in the side mold 312 so as to be electrically connected to the outside. Furthermore, a part of the external backlight control substrate 380 may be inserted into the exterior of the socket 313. The exterior of the socket 313 may be connected to the backlight control substrate 380 through a FPC.

Figure 17:
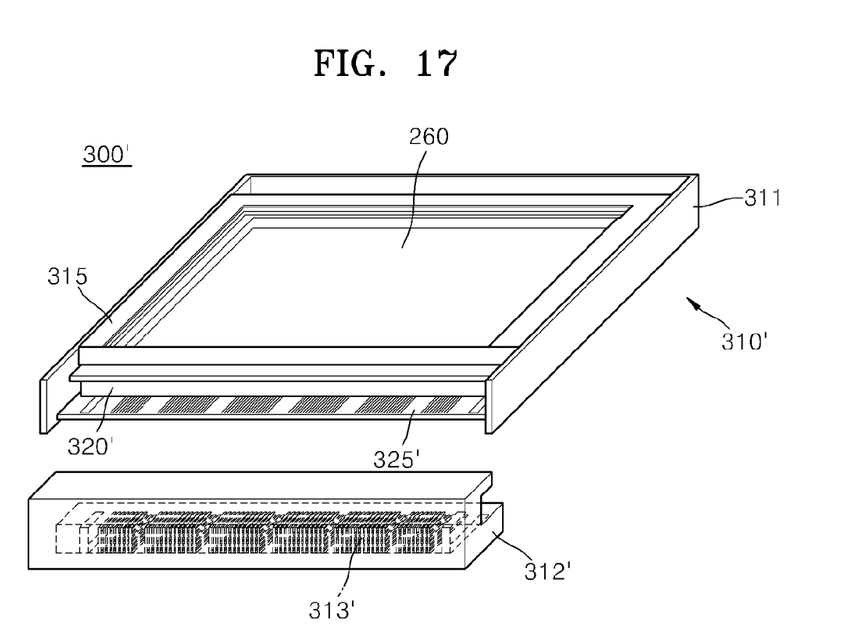
FIG. 17 is a schematic perspective view illustrating an image display apparatus employing a field emission type surface light source device, according to another exemplary embodiment.

In the current exemplary embodiment, the terminal projecting portion 325 of the backlight unit 320 includes the first through third terminals 181, 183, and 185 (see FIG. 1) each having a protruding structure, but the present invention is not limited thereto. FIG. 17 is a schematic perspective view illustrating an image display apparatus 300' employing a field emission type surface light source device, according to another exemplary embodiment. A terminal projecting portion 325' of a backlight unit 320' has a straight end portion. In this case, a socket 313' disposed in a side mold 312' has a structure corresponding to the straight end portion.

A field emission type surface light source device and an image display apparatus employing the field emission type surface light source device have the following effects.

The arrangement of electrode terminals is improved so as to facilitate mounting of the field emission type surface light source device.

Also, when the field emission type surface light source device is used as a backlight unit of the image display apparatus, an arrangement interference between the image display apparatus and a control cable may facilitate assembling of the image display apparatus.

Furthermore, the arrangement of the electrode terminals may minimize an invalid light emitting region.

While an electronic apparatus employing a field emission type surface light source device and an image display apparatus employing the field emission type surface light source device according to the exemplary embodiments have been particularly shown and described, it will be understood by those of ordinary skill in the art that various changes in form and details may be made therein without departing from the spirit and scope of the present invention as defined by the following claims.

What is claimed is:

1. A field emission surface light source device comprising:
a first substrate and a second substrate that are disposed to face each other, wherein each of the first substrate and the second substrate comprise:
  a top surface;
  a bottom surface; and
  a plurality of lateral sides;
a sealing member that seals the first substrate and the second substrate;
first electrodes and second electrodes that are disposed on the first substrate such that the first electrodes cross the second electrodes in an insulated state;
electron emitters that are electrically connected to one of the first electrodes and the second electrodes;
a phosphor layer that is disposed on one surface of the second substrate;
a third electrode that is disposed on one surface of the phosphor layer; and
a first terminal and a second terminal that are electrically connected the first electrodes and the second electrodes, respectively, and are disposed on the top surface and extend to a same lateral side of the plurality of lateral sides of the first substrate outside of a region sealed by the sealing member.

2. The field emission surface light source device of claim 1, wherein the first substrate and the second substrate are substantially quadrilateral flat plates, and the sealing member has a substantially quadrilateral lattice shape.

3. The field emission surface light source device of claim 1, wherein a light-emitting region defined by regions where the first electrodes and the second electrodes cross each other emits light in block units, the first electrodes positioned in the same block unit are connected to the first terminal through a common first connecting line, and the second electrodes positioned in the same block unit are connected to the second terminal through a common second connecting line.

4. The field emission surface light source device of claim 3, wherein trenches are formed in regions where the first electrodes are disposed on the first substrate, and the first electrodes are disposed on lower surfaces of the trenches.

5. The field emission surface light source device of claim 3, wherein the first connecting lines alternately extend to two sides of the light-emitting region to be connected to the first terminal.

6. The field emission surface light source device of claim 3, wherein the first connecting lines extend to one side of the light-emitting region to be connected to the first terminal.

7. The field emission surface light source device of claim 3, wherein trenches are formed in regions where the first electrodes are disposed on the first substrate, and the first electrodes are disposed on lower surfaces of the trenches; and
the trenches are formed to extend from the light-emitting region, and the first connecting lines are disposed on lower surfaces of the extending trenches.

8. The field emission surface light source device of claim 1, further comprising a third terminal that is electrically connected to the third electrode and disposed outside of the region sealed by the sealing member on the same top side of the first substrate that the first terminal and the second terminal are disposed, and a connecting electrode that is electrically connected to the third electrode and disposed in the sealing member.

9. The field emission surface light source device of claim 8, wherein the connecting electrode passes through the sealing member.

10. The field emission surface light source device of claim 8, wherein the connecting electrode has a clip shape that is inserted into a part of an outer portion of the sealing member.

11. The field emission surface light source device of claim 8, wherein the connecting electrode surrounds at least a part of the outer portion of the sealing member.

12. The field emission surface light source device of claim 1, wherein the electron emitters are disposed only on the first electrodes, so that the first electrodes function as cathodes, the second electrodes function as gate electrodes, and the third electrode functions as an anode.

13. The field emission surface light source device of claim 1, further comprising a housing in which the first substrate and the second substrate are installed,
wherein the housing comprises a three-surface box bottom chassis of which one opened surface portion exposes the first terminal and the second terminal, and a side mold inserted into the opened surface portion of the bottom chassis.

14. The field emission surface light source device of claim 13, wherein a gap is provided between the bottom chassis and the side mold, and a flexible printed circuit configured to connect the first terminal and the second terminal to an external backlight control substrate passes through the gap.

15. The field emission surface light source device of claim 13, wherein the first substrate comprises a terminal projecting portion extending in a direction in which the first terminal and the second terminal are disposed with respect to the second substrate; and the terminal projecting portion is inserted into a first socket portion that is disposed in the side mold and electrically connects the first terminal and the second terminal to the external backlight control substrate.

16. The field emission surface light source device of claim 15, wherein the terminal projecting portion comprises the first terminal and the second terminal each having a protruding structure.

17. The field emission surface light source device of claim 15, wherein the terminal projecting portion has a straight end portion.

18. The field emission surface light source device of claim 15, wherein the external backlight control substrate is inserted into a second socket portion that is disposed in the side mold and is electrically connected to the first socket portion.

19. An image display apparatus comprising:
a backlight unit; and
a display panel for forming an image by using light emitted from the backlight unit;
wherein the backlight unit comprises:
a first substrate and a second substrate that are disposed to face each other, wherein each of the first substrate and the second substrate comprises:
a top surface;
a bottom surface; and
a plurality of lateral sides;
a sealing member that seals the first substrate and the second substrate;
first electrodes and second electrodes that are disposed on the first substrate such that the first electrodes and the second electrodes cross each other in an insulated state;
electron emitters that are electrically connected to one of the first electrodes and the second electrodes;
a phosphor layer that is disposed on one surface of the second substrate;
a third electrode that is disposed on one surface of the phosphor layer; and
a first terminal and a second terminal that are electrically connected the first electrodes and the second electrodes, respectively, and are disposed on the top surface and extend to a same lateral side of the plurality of lateral sides of the first substrate outside of a region sealed by the sealing member.

20. The image display apparatus of claim 19, wherein the display panel is a liquid crystal display panel.

* * * * *